United States Patent
Barbier et al.

[11] Patent Number: 5,440,114
[45] Date of Patent: Aug. 8, 1995

[54] COMBINED DEVICE FOR SCREEN DISPLAY AND FOR THE DETECTION OF THE POSITION OF A LOCATION MARKER IN RELATION TO THE SCREEN WITH AN INFRARED SURFACED DETECTOR

[75] Inventors: Bruno Barbier, Le Bouscat; Jean-Jacques Favot, Martignas en Jalles; Patrick Lach, Bordeaux; Jean-Noël Perbet, Eysines, all of France

[73] Assignee: Sextant Avionique, Meudon La Foret, France

[21] Appl. No.: 313,557

[22] Filed: Sep. 27, 1994

Related U.S. Application Data
[63] Continuation of Ser. No. 153,972, Nov. 18, 1993, abandoned.

[30] Foreign Application Priority Data
Nov. 19, 1992 [FR] France ................... 92 13900

[51] Int. Cl.⁶ .................... G01C 21/02; G01C 21/24
[52] U.S. Cl. ................. 250/206.2; 250/203.2; 345/158
[58] Field of Search .......... 250/206.2, 206.1, 203.1, 250/203.2; 345/166, 168, 165, 163, 158, 156, 157, 181

[56] References Cited
U.S. PATENT DOCUMENTS
3,534,359 10/1970 Harris .
4,565,999 1/1986 King et al. .................. 345/158
4,988,981 1/1991 Zimmerman et al. ............ 345/158

FOREIGN PATENT DOCUMENTS
0199526 10/1986 European Pat. Off. .
0484160 5/1992 European Pat. Off. .
0515015 11/1992 European Pat. Off. .
2206203 12/1988 United Kingdom .

OTHER PUBLICATIONS
Patent Abstracts of Japan, vol. 16, No. 281, Jun. 23, 1992, & JP-A-4074285, Mar. 9, 1991, Hori Tetsuya, "Position Detecting and Display Device for Specific Person or Object".

*Primary Examiner*—David C. Nelms
*Assistant Examiner*—Que T. Le
*Attorney, Agent, or Firm*—Oblon, Spivak, McClelland, Maier & Neustadt

[57] ABSTRACT

The disclosure relates to the display, by projection on a screen, of an image managed by a computer system and to the input of data into the data-processing system by the shifting of a location marker in relation to the screen. A device for display by the projection of an image on a screen incorporates a surface detector of infrared radiation positioned behind the projection objective by means of a mirror separating the visible radiation and the infrared radiation. This display device is complemented by an infrared emitter with directional radiation, with which the observer traces a location marker on the screen which may take the form of a visible pointer overprinted on the image.

9 Claims, 2 Drawing Sheets

COMBINED DEVICE FOR SCREEN DISPLAY AND FOR THE DETECTION OF THE POSITION OF A LOCATION MARKER IN RELATION TO THE SCREEN WITH AN INFRARED SURFACED DETECTOR

This application is a continuation of application Ser. No. 08/153,972, filed on Nov. 18, 1993, now abandoned.

BACKGROUND OF THE INVENTION

1. Field of the Invention

The present invention relates to the display, by projection on a screen, of an image managed by a computer system and to the introduction or input of data into the data-processing system by the shifting of a location marker in relation to the screen.

The devices used for screen display and the devices for the input of data elements by the shifting of a pointer on the screen are often associated as peripherals of a data-processing system.

2. Description of the Prior Art

Thus, there are known work stations connected to a data-processing system that are equipped firstly with a display screen and secondly with an alphanumerical keyboard with mouse, joystick or trackball, or with a touch screen. The data elements coming from the data input device are processed by the data-processing system so as to be shown in a particular form in the image displayed in order to provide the operator with a visual check on the operation of the data input device.

Data input devices are classified into two types depending on the distance between them and the display device.

They may be close to the display device, like the touch screen which is superimposed on the display screen. Their drawbacks then are that they have a size of the same magnitude as the image, they lower the quality of the image by causing reflections and a decrease in luminosity and they cannot be used at a distance from the screen.

They may be at a distance from the display device as is the case with an alphanumerical keyboard, a mouse, a joystick or a trackball. Their drawbacks then are that they are bulky, mechanically complicated and require a link, for the transmission of the data entered, that is often a electrical wire link. Furthermore, the data element entered depends on only two or three positioning parameters such as the position of the finger in the plane of the alphanumerical keyboard, the position of the mouse in its plane of maneuvering or the angular position of the handle of a joystick.

SUMMARY OF THE INVENTION

The present invention is aimed at overcoming the above-mentioned drawbacks and at obtaining a data input device activated by an operator and combined with a display device that meets the following constraints. It must:

- be simple, light and compact;
- be capable of being used either at a distance from or close to the display screen;
- not lower the quality of the image of the display device;
- not make it necessary to have any detection device in the vicinity or at the periphery of the display screen;
- not use any wire link with the display screen.

An object of the invention is a combined device for screen display and for the detection of the position of a location marker with respect to the screen comprising a system of display by projection with an image-forming device that illuminates the projection screen, which is a transparent and at least partially scattering screen, by means of an optical objective conjugating the visible image produced by the image-forming device and the projection screen. This combined device furthermore comprises:

- an infrared emitter fitted into the location marker whose instantaneous position in relation to the projection screen is to be detected, said infrared emitter being constituted by at least one directional, point infrared source giving rise to an infrared spot on the projection screen,
- a device for the separation of visible radiation and infrared radiation by orientation in two different directions, interposed between the image-forming device and the objective in such a way that the visible light emitted by the image-forming device is transmitted to the optical objective and the infrared light coming from the optical objective, which is also transparent for this type of radiation, is deflected from the image-forming device, and
- a surface detector of infrared radiation that is positioned beside the image-forming device, behind the separator device in the path of the infrared radiation coming from the optical objective so that said optical objective which, already in one direction of transmission, conjugates the visible image produced by the image-forming device and the projection screen, also conjugates, in the other direction of transmission, the infrared image produced by the infrared emitter on the projection screen and the surface detector of infrared radiation.

BRIEF DESCRIPTION OF THE DRAWINGS

Other features and advantages of the invention will emerge from the following description of an embodiment given by way of an example. This description will be made with reference to the drawings, wherein.

MORE DETAILED DESCRIPTION

Figure 1:
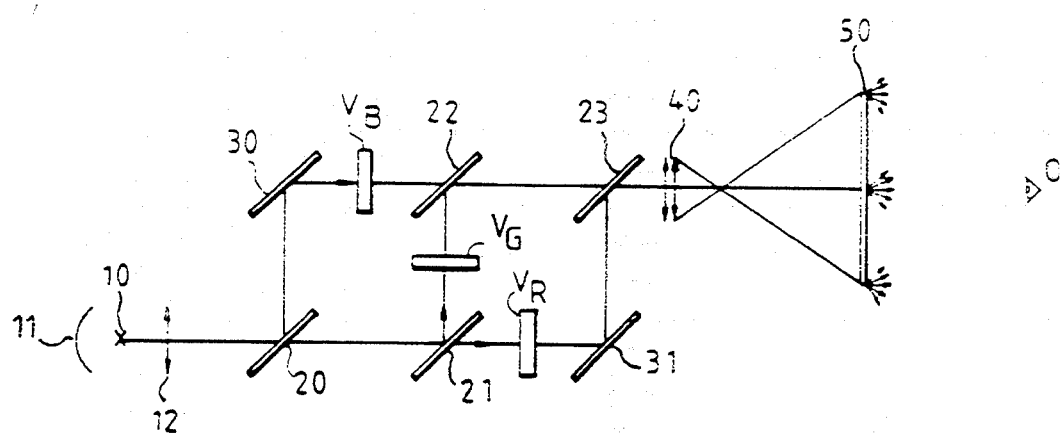
FIG. 1 is an optical diagram of a known type of device for display by projection on a screen.

The known type of device, shown in FIG. 1, for the display of a color image by projection on a screen, essentially comprises an image-forming device illuminating a screen 50 by means of an objective 40.

The image-forming device is formed by a source of white light and a modulation system in which the white light from the source is split up into three basic components, blue, green and red, that are subjected to three distinct optical valves $V_B$, $V_G$ and $V_R$ individually defining the blue, green and red components of an image and that are then combined to form a color image.

The white light source 10 has its radiation brought together and collimated towards the modulation system by means of a reflector 11 and an optical system 12. If necessary, it may be complemented by a filter that stops the infrared radiation to limit the heating of the modulation system.

The modulation system is constituted by three distinct optical valves $V_B$, $V_G$ and $V_R$ and a set of six simple or dichroic mirrors placed at the corners of a rectangle and in the middle of the lengths of this rectangle so as to make the three fundamental components travel through paths having the same length.

The white radiation of the light source 10 encounters firstly a dichroic mirror 20 placed at 45°, reflecting the blue radiation and letting through the green radiation and the red radiation which are at higher wavelengths. The green radiation and red radiation, having crossed the dichroic mirror 20, then encounter a second dichroic mirror 21 also positioned at 45 degrees, reflecting the green radiation and letting through the red radiation. Thus, there is obtained a splitting of the white light of the source 10 into three separate sets of radiation colored blue, green and red.

The blue radiation, generated by reflection on the dichroic mirror 20, is reflected by a simple mirror 30 placed at 45 degrees towards the optical valve $V_B$ which is a liquid crystal device and defines the blue component of the image.

The green radiation, generated by reflection on the dichroic mirror 21, goes through the optical valve $V_G$ which is a liquid crystal device and defines the green component of the image.

The red radiation generated at the crossing of the dichroic mirror 21 goes through the optical valve $V_R$ which is also a liquid crystal device and defines the red component of the image.

The blue and green components of the image generated by the optical valves $V_B$ and $V_G$ are combined by means of a dichroic mirror 22 reflecting the green radiation and letting through the blue radiation with a shorter wavelength.

The red component of the image generated by the optical valve $V_R$ is reflected by a simple mirror 31 at 45 degrees and is then combined with the blue and green components of the image by a dichroic mirror 23 which reflects the red radiation and lets through the blue radiation and green radiation having shorter wavelengths.

The three components, blue, green and red, of the image, which are combined at output of the dichroic mirror 23, then go through the objective 40 which forms an enlarged image of the three optical valves $V_B$, $V_G$ and $V_R$ placed at the same distance, on the projection screen 50, thus conjugating the color image produced by the image-forming device and the projection screen 50.

The projection screen 50, which is a transparent and scattering device, works in transmission mode and enables an observer placed at O to receive the radiation coming from any point of the projected image while the rays forming this point on the screen do not have the appropriate direction, before the screen, to reach the observer's eye.

A known improvement of this type of device for display by projection on the screen consists in making the projection screen partially scattering and in adding a field lens (Fresnel type lens) so that the image of the pupil of the objective gets formed at the observer's position. As a result, all the rays coming from the objective 40 participating in the formation of a dot of the image on the screen are pointed towards the observer who sees a far brighter image owing to the low level of scattering by the screen.

Figure 2:
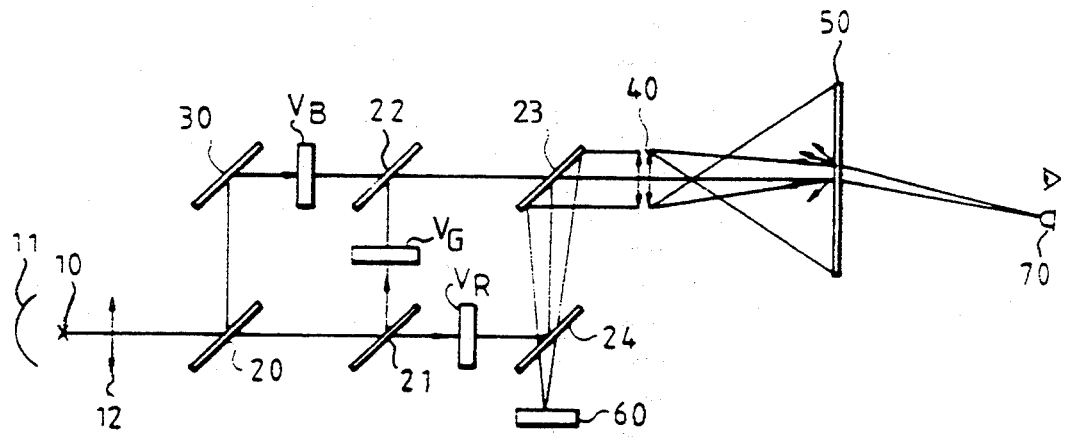
FIG. 2 is an optical diagram of a combined device, according to the invention, for display by projection on a screen and detection of the position of a location marker in relation to the screen.

FIG. 2 shows a device for display, by projection, on a screen. This is a device of the previous type, modified in order to combine it with a system for the detection of the position of a location marker in relation to the screen. In this figure, the elements that have not been changed with respect to FIG. 1 have kept the same references.

Advantage is taken of the fact that the objective 40 also lets through an infrared radiation to use it to conjugate an infrared image produced on the screen with an infrared surface detector placed at the same distance as the optical valves $V_B$, $V_G$ and $V_R$ on a path proper to the infrared radiation.

To do this, it is observed that an infrared radiation coming from the screen 50 through the objective 40 is reflected at the same time as the red radiation by the dichroic mirror 23 placed at the output of the image-forming device since this dichroic mirror 23 lets through only the wavelengths smaller than that of the red radiation. The infrared radiation, which is already separated from the blue radiation and green radiation by the dichroic mirror 23, now has to be separated only from the red radiation. This is done by replacing the simple mirror (31, FIG. 1) by a dichroic mirror 24 which reflects the light radiation with wavelengths smaller than or equal to that of the red radiation and lets through the infrared radiation.

Then an infrared surface detector 60, having dimensions comparable to that of an optical valve is placed in the prolongation of the dichroic mirror 23, 24, at a same distance from the objective 40 as the optical valves $V_B$, $V_G$, $V_R$. Thus, the objective 40 which, in one direction of transmission, already conjugates the color image produced at the optical valves $V_B$, $V_G$ and $V_R$, and the projection screen 50, also conjugates, in the other direction of transmission, an infrared image produced at the projection screen 50 and the infrared surface detector 60.

Figure 3:
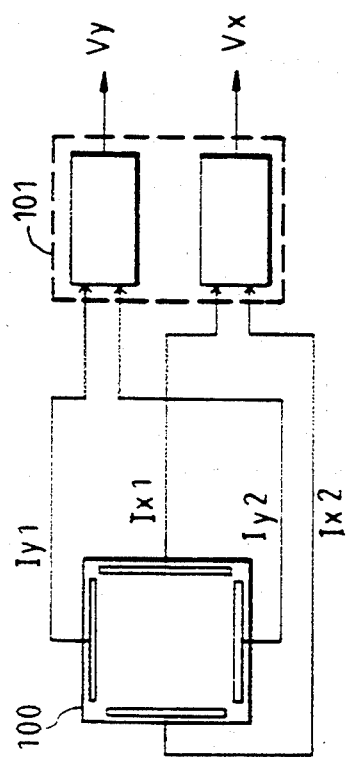
FIG. 3 shows a electrical diagram of an infrared surface detector used in the combined device of FIG. 2.

The infrared surface detector 60 is advantageously of the lateral effect photodiode type such as, for example, the model referenced PIN-DLS 20 by the firm United Detector Technology. As shown in FIG. 3, it takes the form of a photosensitive square plate 100 which, when associated with an electronic module 101, delivers two location-marking signals $V_x$ and $V_y$ whose instantaneous values, which are independent of the illumination level, are proportional to the position of a light spot on the sensitive surface in relation to two perpendicular directions, one direction x called the horizontal direction and the other direction y called the vertical direction.

The photosensitive square plate 100 has four peripheral electrodes delivering four currents $1x_1$, $1x_2$, $1y_1$, $1y_2$, whose instantaneous value depends on the level of illumination received and whose disparities, in sets of two $1x_1-1x_2$, $1y_1-1y_2$, depend on the distribution of the illumination along the two predefined perpendicular directions the x, y on sensitive surface.

The electronic module 101 generates the horizontal and vertical location-marking signals Vx and Vy from the difference between the instantaneous currents relating to a same direction weighted by their sum:

$$Vx = \frac{lx_1 - lx_2}{lx_1 + lx_2} \qquad Vy = \frac{ly_1 - ly_2}{ly_1 + ly_2}$$

An infrared emitter is associated with the location marker to detect its position with reference to the projection screen 50 (FIG. 2). This infrared emitter may be constituted by one or more directional, point infrared sources creating infrared spots on the projection screen. When the infrared emitter is constituted by a single infrared diode with a directional beam 70 (FIG. 2) operated by the observer, he may make a tracing, on the projection screen 50, of an infrared spot whose position, immediately localized by the infrared surface detector 60, may be marked by means of a visible pointer displayed on the projection screen 50 using, for example, the electronic assembly of FIG. 4.

Figure 4:
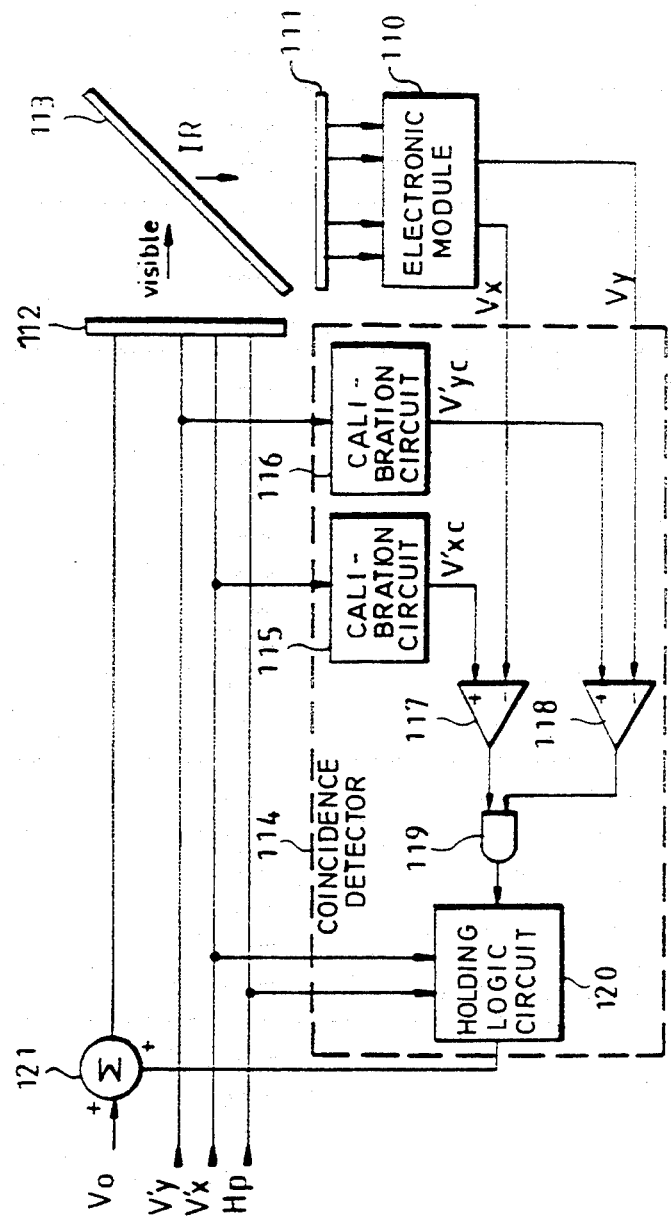
FIG. 4 is a diagram of an electrical coupling between an optical valve and an infrared surface detector making it possible, by means of a visible pointer, to localize an infrared spot traced on the projection screen of the combined display device of FIG. 2.

The electronic assembly of FIG. 4 illustrates a possible mode of interaction between the horizontal and vertical location-marking signals Vx and Vy of the electronic module 110 of the infrared surface detector 110, 111 and the image recording signal of a liquid crystal optical valve 112 generating one of the components, blue, green or red, of the image displayed on the projection screen. The infrared surface detector 111 and the optical valve 112 which are pointed towards the objective are separated by a dichroic mirror 113 that carries out the separation of the visible radiation and the infrared radiation. The optical valve 112 has a surface formed by a set of juxtaposed pixels, with electrically controlled transparency, addressed one by one, by framewise scanning, by means of horizontal V'x and vertical V'y addressing logic electrical signals associated with a pixel clock signal Hp defining the rate of addressing of the pixels and with a video signal Vo defining the transparency of the addressed pixel.

A coincidence detector 1.14 is used to detect the instant at which the coordinates of the pixel being addressed in the procedure for the recording of the blue, green or red image component on the optical valve 112 coincide with those of the infrared spot delivered by the electronic module 110 of the surface detector 111 to enforce the state of transparency of this pixel and of an adjoining zone in order to display a bright or dark pointer, in a state of contrast in the image, at the position of the projection screen at which the infrared spot is located.

This coincidence detector 114 may comprise, as shown, two calibration circuits 115, 116, two comparators 117, 118, a logic port 119 and a holding logic circuit 120. The two calibration circuits 115, 116 receive the horizontal V'x and vertical V'y addressing logic electrical signals for the addressing of the optical valve 112, convert them into analog scanning signals so that their instantaneous values represent the position of the addressed pixel, the transparency of which is given by the instantaneous value of the video signal, and calibrate them in amplitude so as to give them overall amplitudes of variation equal to those of the horizontal (Vx) and vertical (Vy) location-marking signals of the electronic module 110 of the infrared surface detector 11. One of the comparators 117 receives, at its non-inverter input, the calibrated horizontal scanning signal V'xc coming from the calibration circuit 115 and, at its inverter input, the horizontal location-marking signal Vx coming from the electronic module 110 and delivers, at output, a logic signal going to the state 1 when the calibrated horizontal scanning signal V'xc exceeds the horizontal location-marking signal Vx in amplitude. The other comparator 118 receives, at its non-inverter input, the calibrated vertical scanning signal V'yc coming from the calibration circuit 116 and, at its inverter input, the vertical location-marking signal Vy coming from the electronic module 110, and delivers, at output, a logic signal going to the state 1 when the calibrated vertical scanning signal V'yc exceeds the vertical location-marking signal Vy in amplitude. The "AND" type logic port 119 connected at input to the outputs of the two comparators 117, 118 delivers, at output, a positive transition passing from the logic level 0 to the logic level 1 when the two calibrated scanning signals V'xc and V'yc become greater in amplitude than the location-marking signals Vx and Vy, i.e. when the coordinates of the pixel undergoing recording on the optical valve coincide with those of the infrared spot on the projection screen. The holding logic circuit 120, based on flip-flop circuits, is triggered by a rising edge of the output signal of the logic gate 119 and kept active for the duration of some pixels, and this is done during several periods of the horizontal scanning signal to cover the instants of recording of a zone of pixels centered on the infrared spot. A summator 121 interposed in the path of the video signal Vo enables the holding logic circuit 120, when it is activated, to enforce the video signal to a maximum or minimum level to provide opacity or transparency to a zone of pixels demarcating a pointer designating the position, on the screen, of the infrared spot.

Thus the operator, by means of the pointer, can make visual checks continuously and without delay of the position of the location marker that he shifts by moving the infrared diode 70 (FIG. 2) for example with the hand or a finger-tip.

Moving the infrared diode away from the projection screen enlarges the infrared spot on the screen and reduces its density but does not reduce the mean level of illumination of the infrared surface detector and, consequently, the levels of the signals given by the detector.

The shifting of the infrared spot and of the pointer superimposed on it is essentially due to a shifting, parallel to the plane of the screen, of the infrared diode when this diode is close to the screen or to a change in orientation of this diode when it is far from the screen. These two modalities of data input, close to the screen or at a distance from it, are permanently available to the observer.

Of course, the mode of creation of the pointer designating the location of the infrared spot on the projection screen may be different from the one just described. In general, the two location-marking signals Vx and Vy delivered by the infrared surface detector are applied to the electronic image generator of the display system to enable said system to generate a symbol or pointer in the visible image, the size, color or any other attribute of said symbol or pointer being a function of the position of the center of the infrared spot on the projection screen.

It is advantageous to modulate the optical power delivered by the infrared diode by modulating its excitation current to reduce the effects of disturbance produced on the system by scattered daylight or by direct sunlight on the projection screen. Indeed, the ambient light environment may produce an inhomogeneous infrared illumination on the projection screen, giving rise to a parasitic disequilibrium between the different currents delivered by the infrared detector which gets added to the disequilibrium, to be measured, that is produced by the infrared spot.

Through this modulation of the optical power of the infrared diode, which may be a sinusoidal modulation, it is possible, by filtering, to eliminate the continuous components due to the ambient lighting from the currents $Ix_1$, $Ix_2$, $Iy_1$, $Iy_2$ given by the infrared surface detector or from the location-marking signals $Vx$, $Vy$ given by its electronic module.

As indicated here above, the projection screen may be partially scattering or made directional by a field glass so that the image of the pupil of the objective is formed at the position of the observer and so that the observer sees a brighter image. The infrared diode is then used so as to be placed in the output pupil of the projection system. As a result, all its infrared rays pointed towards the projection screen reach the infrared surface detector. Furthermore, the influence of the ambient infrared radiation on the infrared surface detector is reduced inasmuch as only the parasitic radiation coming from the output pupil reaches the detector. Now, at this position, there is the observer who tends to block the parasitic radiation rather than re-scatter it.

The infrared emitter may comprise several infrared diodes with divergent pinpoint beams whose infrared spots on the projection screen are distinguished at the detector by means of a technique of time-division multiplexing or frequency-division multiplexing. The data collected on positions of the different spots on the projection screen then gives information elements on the relative position of the infrared emitter with respect to the projection screen.

For example, with an emitter formed by two infrared diodes attached to the end of the observer's index finger observer with slightly divergent directions of radiation pointed towards the screen, two infrared spots are obtained, the relative distance of which provides information on the distance between the observer's index finger and the screen. This makes it possible to distinguish, in addition to the region aimed at on the screen, the motions by which the emitter approaches or moves away. These motions can be used to express a command by the observer.

With three infrared diodes emitting pinpoint radiation, oriented so as to have directions of radiation that are convergent at one and the same point, perpendicular to each other in sets of two and aimed at the projection screen, a mobile trirectangular location marker is created with a position and orientation in relation to the screen that may be deduced from the positions of the three infrared spots generated on the screen. Indeed with the six degrees of freedom in the positioning of the mobile trirectangular location marker, there are associated the six values of parameters obtained by the measurement of the position on the screen of the three infrared spots.

What is claimed is:

1. A combined device for screen display and for the detection of the position of a location marker with respect to a projection screen, said device comprising:
   a system of display by projection with a color image-forming device operating by adding three monochrome primary images, one blue, another green and the last red, and illuminating the projection screen (50), which is a transparent and at least partially scattering screen, by means of an optical objective conjugating the visible image produced by the color image-forming device and the projection screen, said color image-forming device comprising three separate optical valves each illuminated by a monochrome light respectively blue, green and red and situated at a same distance from the optical objective on various optical paths, a first dichroic mirror facing the optical valves dedicated to the blue and green monochrome images and bringing together their optical paths leading to the optical objective, and a second dichroic mirror facing the optical objective and bringing together the optical path of the red monochrome image leading to the optical objective with the common optical paths of the blue and green monochrome images coming from the first dichroic mirror,
   an infrared emitter fitted into the location marker whose position in relation to the projection screen is to be detected, said infrared emitter being constituted by at least one directional, point infrared source giving rise to an infrared spot on the projection screen,
   a device for the separation of visible radiation and infrared radiation by orientation in two different directions, interposed in front of the optical objective, on the side of the color image-forming device, in such a way that the visible light emitted by the color image-forming device is transmitted to the optical objective and the infrared light coming from the optical objective, which is also transparent for this type of radiation, is deflected from the color image-forming device, and
   a surface detector of infrared radiation that is positioned beside the color image-forming device, behind the separator device in the path of the infrared radiation coming from the optical objective so that said optical objective which, already in one direction of transmission, conjugates the visible image produced by the color image-forming device and the projection screen, also conjugates, in the other direction of transmission, the infrared image produced by the infrared emitter on the projection screen and the surface detector of infrared radiation, wherein said device for the separation of visible radiation and infrared radiation comprises a third dichroic mirror interposed between the optical valve dedicated to the red monochrome image and the second dichroic mirror bringing together the path of the red monochrome image and the common paths of the blue and green monochrome images.

2. A device according to claim 1, wherein the surface detector of infrared radiation is of the lateral effect photodiode type.

3. A device according to claim 2, with said three valves each having a sensitive surface formed by a set of juxtaposed pixels, with electrically controlled transparency, addressed by means of horizontal and vertical addressing logic electrical signals associated with a pixel clock signal defining the rate of examination of the pixels and with a video signal defining the transparency of the addressed pixel, said device further comprising a pointer generator localizing the position of the location marker in the image projected on the screen.

4. A device according to claim 3, wherein said pointer generator comprises a coincidence detector detecting the instant at which the coordinates of the pixel being scanned in the procedure for recording on the optical valve coincide with those of the location marker delivered by the surface detector of infrared radiation and a summator interposed in the path of the video signal enabling the coincidence detector to enforce the video signal to a level ensuring that a pointer is overprinted on the visible image.

5. A device according to claim 1, wherein said infrared emitter is constituted by an infrared diode with directional, pinpoint radiation generating, on the projection screen, an infrared spot constituting a location marker whose position is detected by the surface detector of infrared radiation.

6. A device according to claim 5, wherein said infrared diode has a radiation modulated in intensity so that it can be distinguished from the ambient infrared radiation.

7. A device according to claim 1, wherein said infrared emitter is constituted by several infrared diodes with directional, pinpoint radiation intercepting the projection screen, said radiation being time-division multiplexed.

8. A device according to claim 1, wherein said infrared emitter is constituted by several infrared diodes with directional, pinpoint radiation intercepting the projection screen, said radiation being frequency-division multiplexed.

9. A device according to claim 1, wherein said infrared emitter is constituted by three infrared diodes emitting pinpoint radiation, oriented so as to have directions of pinpoint radiation that are convergent at a same point, perpendicular to each other in sets of two and aimed at the projection screen.

* * * * *